United States Patent

Green, Jr.

[11] Patent Number: 5,701,595
[45] Date of Patent: Dec. 23, 1997

[54] HALF DUPLEX RF TRANSCEIVER HAVING LOW TRANSMIT PATH SIGNAL LOSS

[75] Inventor: Donald R. Green, Jr., San Marcos, Calif.

[73] Assignee: Nippondenso Co., Ltd., Kariya, Japan

[21] Appl. No.: 434,763

[22] Filed: May 4, 1995

[51] Int. Cl.$^6$ .................................................. H04B 1/44
[52] U.S. Cl. .................. 455/83; 455/117; 455/272; 333/1.1
[58] Field of Search ....................... 455/117, 78, 50.1, 455/63, 80, 81, 82, 83, 114, 101, 279.1, 272; 333/1.1, 24.2

[56] References Cited

U.S. PATENT DOCUMENTS

| | | | |
|---|---|---|---|
| 2,890,328 | 6/1959 | Fox | 333/1.1 |
| 3,309,698 | 3/1967 | Baldock | 455/83 |
| 3,739,302 | 6/1973 | McManus | 333/1.1 |
| 4,361,905 | 11/1982 | Etherington et al. | 455/80 |
| 4,380,822 | 4/1983 | Broton | 455/80 |
| 5,022,742 | 6/1991 | Harris | 350/355 |
| 5,093,667 | 3/1992 | Andricos | 342/372 |
| 5,313,138 | 5/1994 | Desmur | 315/3 |
| 5,347,241 | 9/1994 | Panaretos et al. | 333/1.1 |
| 5,374,589 | 12/1994 | Raush et al. | 437/166 |
| 5,453,154 | 9/1995 | Thomas et al. | 216/18 |
| 5,477,532 | 12/1995 | Hoshigami et al. | 370/24 |

FOREIGN PATENT DOCUMENTS

| | | |
|---|---|---|
| 2696887 | 4/1994 | France . |
| 62-102629 | 5/1987 | Japan . |
| 2209024 | 8/1990 | Japan . |
| WO93573 | 7/1993 | WIPO . |

*Primary Examiner*—Reinhard J. Eisenzopf
*Assistant Examiner*—Lee Nguyen
*Attorney, Agent, or Firm*—Cushman, Darby & Cushman IP Group of Pillsbury Madison & Sutro LLP

[57] ABSTRACT

A circulator section in a transceiver receives a transmit signal and an antenna signal and provides them respectively to an antenna and to an electronic switch. The electronic switch operates synchronously with the duplex mode of the transceiver to connect the antenna to a receiver when the transceiver is in receive mode, and to a matched load when it is in transmit mode. Since the signal path of any portion of the transmit signal reflected by a mismatched antenna is terminated by the load, power which otherwise might be reflected back to the transmitter and thereby damage it is instead absorbed by the matching load.

18 Claims, 7 Drawing Sheets

HALF DUPLEX RF TRANSCEIVER HAVING LOW TRANSMIT PATH SIGNAL LOSS

BACKGROUND OF THE INVENTION

1. Field of the Invention

The present invention relates to radio transmitter/receiver, or transceiver, units. More specifically, the invention relates to a circulator used to permit shared use of an antenna by a transmitter and a receiver in such a transceiver during operation in a half duplex mode. Particularly, the invention relates to transceivers of that type which are used in portable cellular telephone systems.

2. Description of the Related Art

Cellular telephone systems have gained widespread use and popularity in recent years due to their portability, utility and convenience. A cellular telephone transceiver typically includes a transmitter section for transmitting a user's outgoing calls to a central cell facility, and a receiver section for receiving incoming calls from the cell facility which have been placed by other users of the cellular network.

Ideally, a cellular telephone should provide its user with the maximum amount of "talk time" possible. Talk time means the amount of time that the telephone can be used before its battery must be recharged; i.e., the maximum usage time between charges. A primary parameter controlling the talk time of a particular cellular unit is its transmitter efficiency; in other words, the percentage of the power supplied from the unit's battery to its transmitter which is realized as RF power transmitted from the antenna. In turn, the most significant factors bearing on a particular unit's transmitter efficiency are the DC-RF power conversion efficiency of the transmitter section's power amplifier, and the signal path loss between the transmitter power amplifier output and the antenna.

Cellular telephones typically fall into two categories. Full duplex systems are those which are capable of transmitting an outgoing call while receiving an incoming call on a common antenna. Analog cellular telephones generally fall into this category.

A portion of a typical full duplex transceiver is shown in FIG. 1. In this Figure, an antenna 10 is connected to a transmitter section 20 and a receiver 1 via a circulator 30. The circulator is typically a three-port transfer network which receives an outgoing transmit signal from transmitter section 20 at a transmitter port 32, and an incoming antenna signal from an antenna 10 at an antenna port 34. The circulator 30 passes these signals to the antenna port 34 and a receiver port 36, respectively. If an incoming signal is applied to the receiver port 36, it will be directed to the transmitter port 32.

The transmit signal is generated by appropriate audio and RF circuitry in a transmitter 2 and is amplified by a power amplifier 22 and supplied to a circulator 30. A small portion of the transmit signal is diverted to a power level detector 3 via a sampler 24 which includes an isolation capacitor 26 so that the power level of the transmitted signal may be monitored and controlled.

A second variety of cellular telephone is the half duplex system where, although the transmitter section and the receiver section share a common antenna, only one of them uses it at any given moment. Digital cellular telephones generally fall into this category. The popularity of such digital cellular systems will undoubtedly increase in the future due to their inherent advantages in user capacity, data transmission bandwidth, user privacy, battery lifetime and overall system infrastructure costs.

The system of FIG. 1 may be used for half duplex operation; however, if the antenna 10 is not properly matched to the transmitter section 20 (for example, due to manufacturing errors or environmental conditions), the receiver 1 may be exposed to transmit power reflected by the antenna impedance, as well as any interference signals the antenna 10 may pick up while the unit is in transmit mode. In extreme circumstances, such reflected power may physically damage the receiver 1.

FIG. 2 shows another typical half duplex transceiver which operates with transmit and receive signals in different frequency bands. This half duplex transceiver is similar to the full duplex transceiver shown in FIG. 1; however, in this design the circulator 30 has its receive port connected to an impedance matching load 38 rather than to the receiver 1. When a circulator is used in this configuration, it is usually known as an isolator, since it isolates the transmitter 2 from incoming antenna-side signals.

In the half duplex system shown in FIG. 2, routing of signals received by the antenna 10 to the receiver 1 is done by a duplex filter 40. Since the transmit and receive signals are in different frequency bands, the duplex filter 40 can route receive signals to the receiver 1 and transmit signals to the antenna 10 using conventional bandpass filtering.

Although this technique is workable, it requires the use of transmit and receive signals in separate frequency bands, which may be an undesirable design constraint in some cases. Also, it introduces a significant amount of attenuation into the signal path from the transmitter 2 to the antenna 10, i.e., the transmit path. For example, at an operating frequency in the 1.5 GHz PDC (Personal Digital Cellular) band, the attenuation of the sampler 24 is typically about 0.2 dB; that of the isolator 30, 0.7 dB; and that of the duplex filter 40, 0.9 dB, for a total signal path loss of about 1.8 dB. Also, use of the duplex filter 40 in the signal path from the antenna 10 to the receiver, i.e., the receive path, results in a receive path loss of about 0.9 dB.

As shown in FIG. 3, the duplex filter 40 may be replaced with a transmit-receive switch 50 (hereinafter referred to as a T/R switch). The T/R switch 50 is essentially a switch selectively providing a signal path between the transmitter section 20 and the antenna 10 via its pole terminal 52 and a first throw terminal 54, or between the antenna 10 and the receiver via its pole terminal 52 and a second throw terminal 56, synchronously with the transmit/receive cycle of the half duplex transceiver.

The advantage of this system is that the T/R switch 50 can be designed to cause less attenuation in the transmit path than does the duplex filter 40; however, the savings on the transmit side is made at the expense of a corresponding increase in signal attenuation on the receive side. For example, a typical commercially-available T/R switch may have a transmit side signal attenuation of 0.3 dB and a receive side signal attenuation of 2.0 dB; thus, the overall loss is about 1.2 dB on the transmit side and 2.0 dB on the receive side.

A further reduction in the transmit path signal attenuation can be had by omitting the isolator 30 as shown in FIG. 4. This eliminates the roughly 0.7 dB attenuation introduced into the transmit path by the isolator 30; however, doing so leaves the power amplifier 22 exposed to transmit power reflected by the antenna 10, as well as any interference signals the antenna 10 may pick up while the unit is in transmit mode. Like the receiver 1, such reflected power may physically damage the power amplifier 22; however, in most cases, it will simply make the power amplifier 22 unstable and cause unacceptable increases in nonlinear distortion therein, a particularly critical consideration in the case of digital cellular telephones.

Moreover, elimination of the isolator 30 requires use of a directional coupler 60 and associated impedance matching load 38 in place of the sampler 24 used in the above-described systems. This is because the sampler 24 diverts power from the transmit signal path irrespective of whether the power is transmit power or reflected power; thus, use of the sampler 24 in this configuration could result in erroneous transmit power level measurements. The directional coupler 60 solves this problem; however, it is more expensive and typically has signal attenuation of about 0.4 dB (compared with the splitter's attenuation of 0.2 dB), which when combined with the 0.3 dB attenuation of the T/R switch 50 results in a total transmit path loss of about 0.7 dB.

The potentially detrimental effects of reflected transmit power on the power amplifier 22 can be alleviated to some degree by implementing a scheme where reflected power in the transmit path is monitored, and the output of the power amplifier 22 is reduced in response to an increase in reflected power; however, the undesirability of the resultant increases in system cost and complexity and the resultant decrease in system reliability should be readily apparent.

SUMMARY OF THE INVENTION

In view of the foregoing problems of the prior art in mind, it is a primary object of the present invention to provide a half duplex RF transceiver which permits increased talk time in comparison with comparable prior art systems.

It is further object of the present invention to provide a half duplex RF transceiver which is particularly suitable for use in portable digital cellular telephone systems and in other personal telephone applications.

It is another object of the present invention to provide a half duplex, receiver-isolating RF transceiver which has a reduced transmit path signal loss in comparison with the prior art.

It is yet a further object of the present invention to provide a half duplex RF transceiver which minimizes nonlinear signal distortion in the transmitter's power amplifier.

It is still another object of the present invention to provide a half duplex circulator unit particularly suitable for use with a receiver in which a received signal is directly converted to baseband by mixing it with a local oscillator signal at the same frequency as the received signal's carrier, such as a zero IF receiver.

It is an even further object of the present invention to provide a half duplex circulator unit for such receivers which reduces local oscillator power radiating from the antenna during reception.

It is yet another object of the present invention is to provide a half duplex transceiver which isolates its receiver from reflected transmit power during the transmit portion of its half duplex cycle.

The above objects of the present invention are achieved by providing a circulator section for a transceiver which includes a circulator which receives a transmit signal and an antenna signal and which provides them respectively to an antenna and to an electronic switch. The electronic switch operates synchronously with the duplex mode of the transceiver to connect the antenna to a receiver when the transceiver is in receive mode, and to a matched load when it is in transmit mode. Since the signal path of any portion of the transmit signal reflected by a mismatched antenna is terminated by the load, no potentially damaging power is presented to the transmitter.

Further, an auxiliary circulator may be used to provide a path between the receiver and an auxiliary matching load to terminate any signals reflected by the receiver. Also, the receiver may selectively be connected to the main antenna or to a diversity reception antenna.

The above objects are further achieved by providing a method of duplexing transmit and receive signals in a transceiver where a signal path is established between a transmitter and an antenna. When the transceiver is in receive mode, a signal path is established between the antenna and a receiver; however, when the transceiver is in transmit mode, a signal path is instead established between the antenna and a matching load. Since any portion of the transmitter signal reflected by a mismatched antenna is terminated by the load, no potentially damaging power is presented to the transmitter.

Further, a signal path may be established between the receiver and an auxiliary load to terminate any signals reflected by the receiver. Also, instead of a signal path to the main antenna, a signal path may be established between the receiver and a diversity reception antenna.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 5:
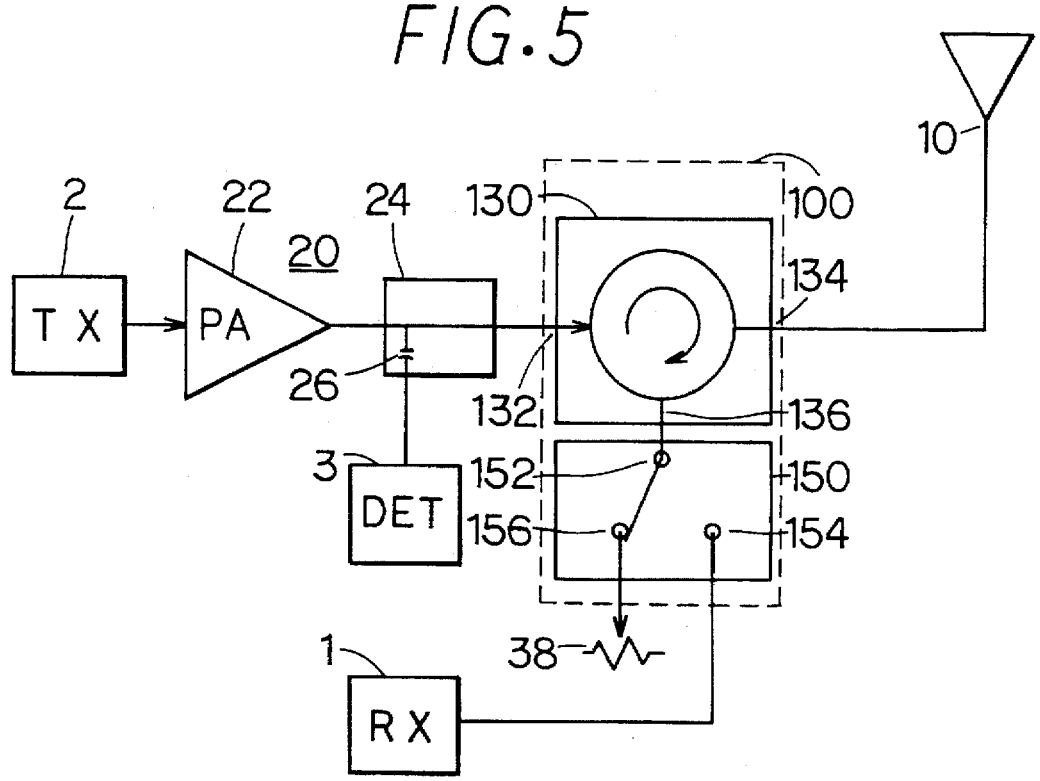
FIG. 5 is a block diagram of a section of an RF transceiver according to a first embodiment of the present invention.

FIG. 5 is a block diagram of a section of an RF transceiver according to a first embodiment of the present invention. In this Figure, an antenna 10 is connected to a transmitter section 20 and a receiver 1 via a circulator unit 100. The transmit signal is generated by appropriate audio and RF circuitry in transmitter 2 as is known in the art, and is amplified by a power amplifier 22 and supplied to circulator unit 100. A small portion of the transmit signal going to the circulator unit 100 is diverted to a power level detector 3 via a sampler 24 which includes an isolation capacitor 26 so that the power level of the transmitted signal may be monitored and controlled.

The circulator unit 100 includes a three-port circulator 130 (preferably, a miniature ferrite circulator such as the Hitachi Model S1-7T) which receives an outgoing transmit signal from the transmitter section 20 at a transmitter port 132, and an incoming antenna signal from the antenna 10 at an antenna port 134. The circulator 130 passes the transmit signal to the antenna 10 via the antenna port 134, and it passes the antenna signal to a T/R switch 150 in the circulator unit 100 via a receiver port 136. The T/R switch 150 selectively passes the antenna signal from antenna 10 presented at its pole terminal 152 to the receiver 1 via a first throw terminal 154 when the transceiver is in receive mode, and to an impedance matching load 38 via a second throw terminal 156 when the transceiver is in transmit mode.

Preferably, the T/R switch 150 is an electronic switch implemented in a relatively high-speed technology such as GaAs or bipolar Si, such as the M/A-COM Model SW-338 or SW-339 available from M/A-COM, Inc., 1011 Pawtucket Boulevard, Lowell, Mass. 01853. Alternatively, a conventional two-port miniature ferrite circulator of the type commonly used in current cellular telephones can be modified for this application by removing the matched third port termination included in the device, and making the third port (corresponding to receiver port 136) available at an external terminal.

As another alternative, the circulator 130 may be advantageously combined with the T/R switch 150 in a custom-made integrated module to reduce component size and RF losses. The power amplifier 22 may also be included in the module for additional reductions in component size and RF loss. In any case, it is preferable that the receive-side loss of the T/R switch be as low as possible. This may be done by using a switch generally having low loss characteristics, or it may be done by wiring an asymmetrical switch with its low-loss side in the receive path.

Figure 6A:
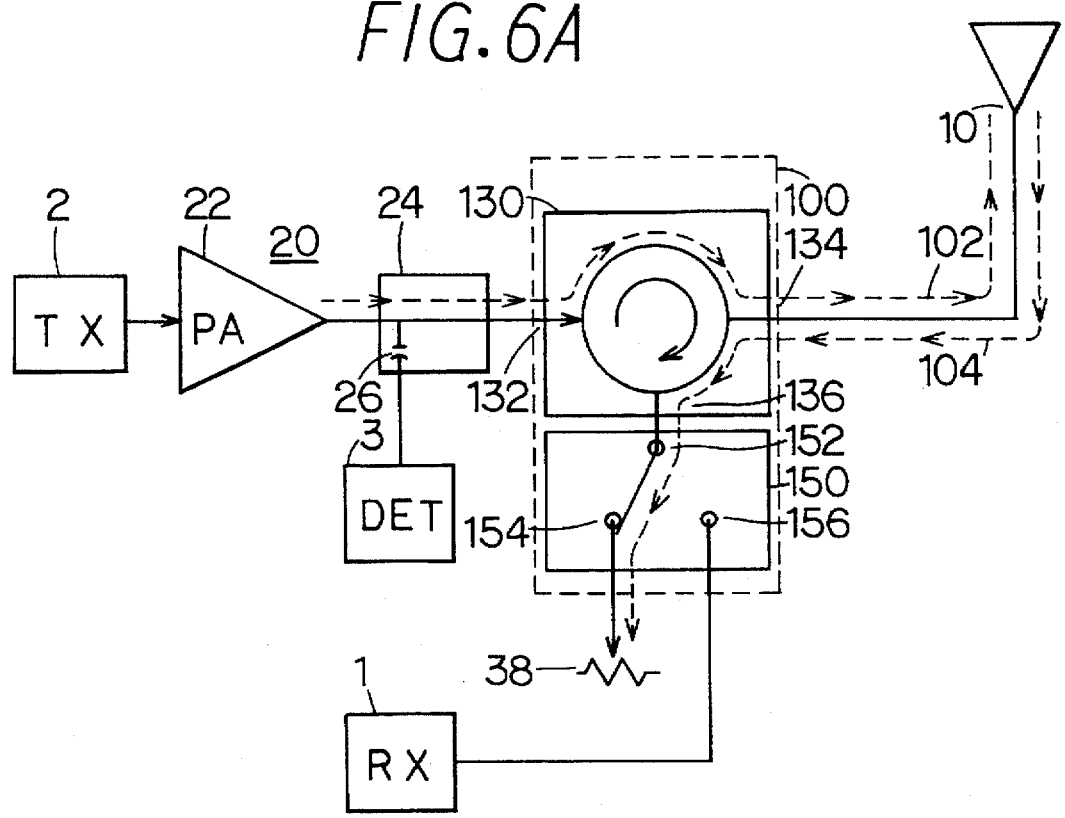
FIGS. 6(A) and 6(B) are block diagrams showing operational principles of the first embodiment.

Operation of the first embodiment will now be described in connection with FIGS. 6(A) and 6(B). FIG. 6(A) shows the transmit signal path 102 from the transmitter section 20 to the antenna 10 and the reflected power signal path 104 from the antenna 10 to the impedance matching load 38 when the transceiver is in transmit mode, and FIG. 6(B) shows the antenna signal path 106 from the antenna 10 to the receiver 1 when the transceiver is in receive mode.

As shown by the transmit signal path 102 in FIG. 6(A), when the transceiver is in transmit mode, the transmit signal from the power amplifier 22 passes through the sampler 24 to the transmit port 132 of the circulator unit 100. Then, it passes through the circulator 132 to the antenna port 134 and to the antenna 10, where it is transmitted as a radio wave.

If the antenna 10 is improperly matched to the transmitter section 20, part of the transmit signal presented to the antenna 10 is reflected back to the transceiver as shown by the reflected power signal path 104. In that case, the reflected power enters the circulator unit 100 at the antenna port 134, and the circulator 132 directs it to the pole terminal 152 of the T/R switch 150 via the receiver port 136. When the transceiver is in transmit mode, the T/R switch directs incoming signals to the impedance matching load 38 via the termination terminal 154, where it is effectively dissipated.

Figure 6B:
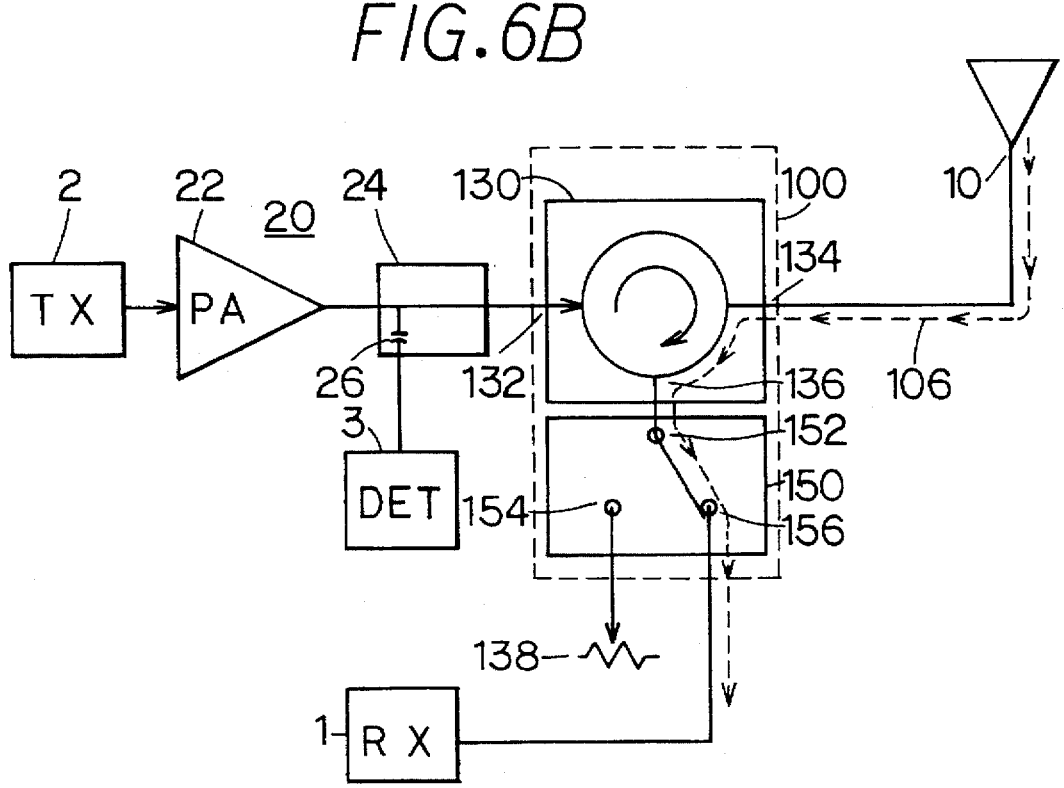

Operation of the first embodiment of the present invention when the transceiver is in receive mode is shown in FIG. 6(B). Here, antenna signal path 106 shows an incoming antenna signal which is picked up by the antenna 10 and fed to an antenna port 134 of the circulator unit 100. The circulator 130 in the circulator unit 100 passes the incoming power to the pole terminal 152 of the T/R switch 150 via the receiver port 136. When the transceiver is in receive mode, the T/R switch 150 directs incoming signals to the receiver 1 via the receive terminal 156.

Thus, when the transceiver is in transmit mode, it forms a low-loss signal path from the power amplifier 22 to the antenna 10. Since any power reflected from the antenna 10 will be diverted from the power amplifier 22 and instead dissipated by the impedance matching load resistor 38, the power amplifier 22 is isolated and the reduction in signal path attenuation need not be made at the expense of leaving the power amplifier 22 unprotected.

As a typical example of the isolation effects provided by the present invention, assume that the transmit signal power at the output of the sampler 24 is 940 mW, and that the circulator 130 has a 0.7 dB forward loss and a 20 dB reverse or isolation loss. Also, assume that the T/R switch 150 has a 0.5 dB "ON" loss and a 20 dB "OFF" loss, that the load mismatch results in a 1.2 voltage standing wave ratio (VSWR) and that the antenna mismatch results in a 1.3 VSWR.

Using the above typical parameters, the transmit signal power passed by the circulator will be 940 mW−0.7 dB=800 mW, and the transmit power reflected back by the antenna 10 will be 13.6 mW. This results in 0.1 mW of reflected transmit power being passed to the receiver 1, and 12.1 mW of reflected transmit power being passed to the matching load resistor 38. The transmit power reflected therefrom, when combined with the small amount of transmit power reflected directly from the antenna 10 through the circulator 130, results in an 0.2 mW signal being presented to the transmit side of the transceiver. A signal of this level will not normally damage the transmit-side components.

Figure 3:
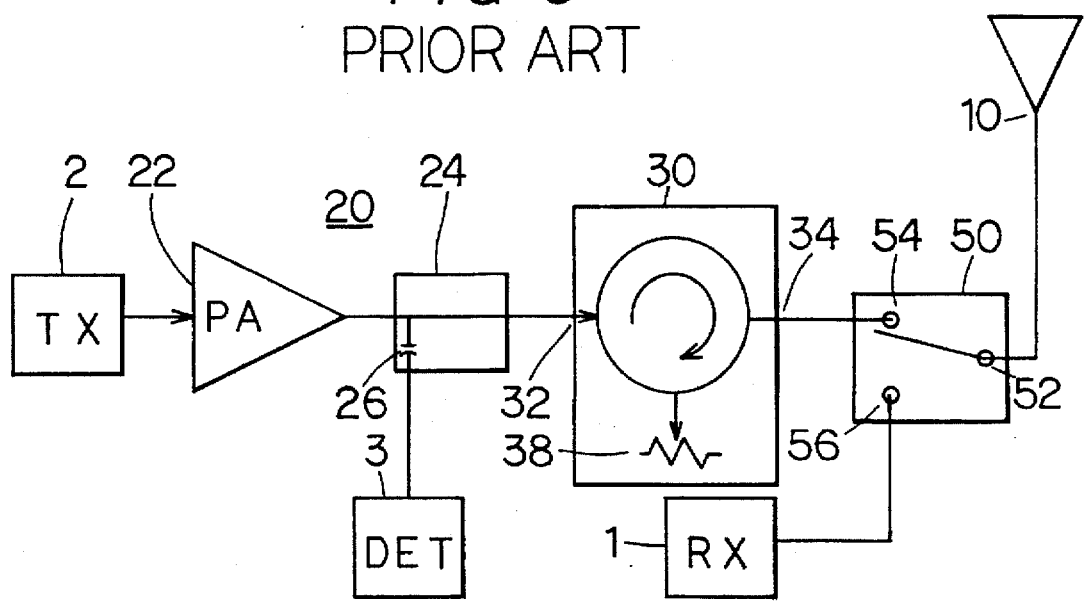
FIG. 3 is a block diagram of a section of a prior art half duplex RF transceiver using a T/R switch.

Table 1 below summarizes a comparison of the operational characteristics of the first embodiment with those of the aforementioned prior art systems. The figures in this Table assume an operating frequency in the 1.5 GHz PDC band and are based on typical attenuation figures of 0.2 dB for a sampler, 0.7 dB for a circulator, 0.9 dB for a duplex filter, 0.5 dB for a T/R switch, and 0.4 dB for a directional coupler as discussed above. The Table shows that only the present invention and the prior art system of FIG. 3 are capable of providing both power amplifier isolation and receiver isolation in transmit mode to protect those units from reflected power damage due to antenna impedance mismatching. Of these, the first embodiment of the present invention clearly has the lowest loss characteristics. Also, no other configuration has a lower transmit path loss figure.

Figure 1:
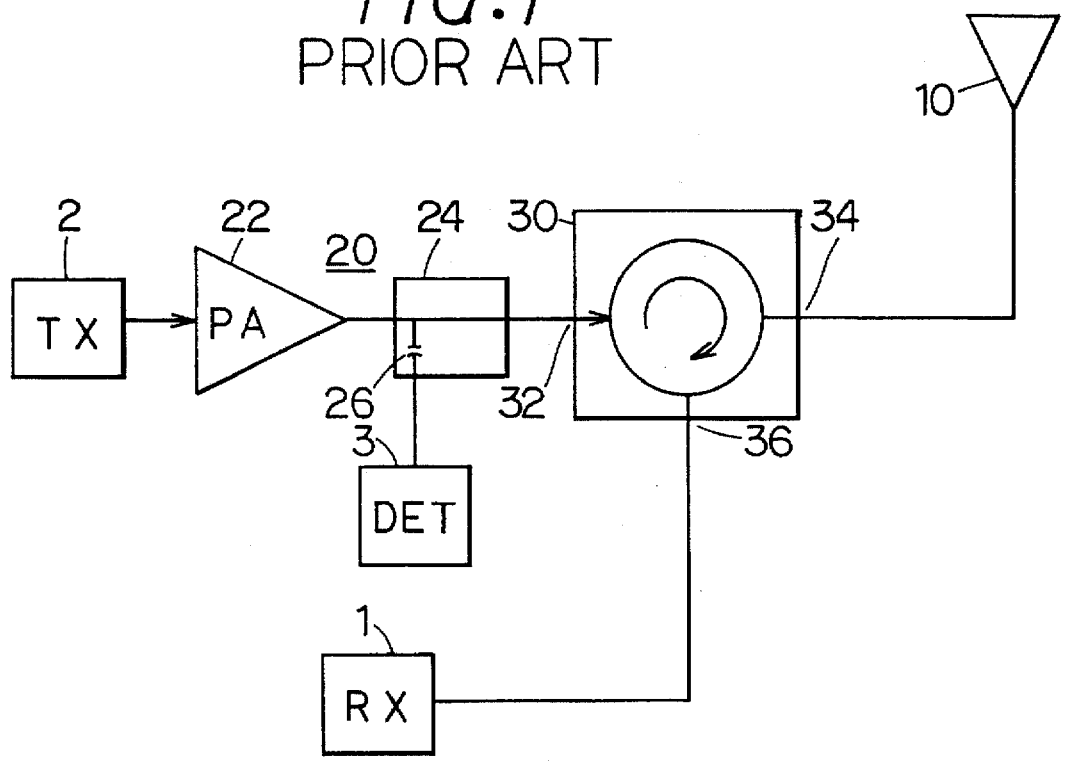
FIG. 1 is a block diagram of a section of a prior art full duplex RF transceiver.
Figure 2:
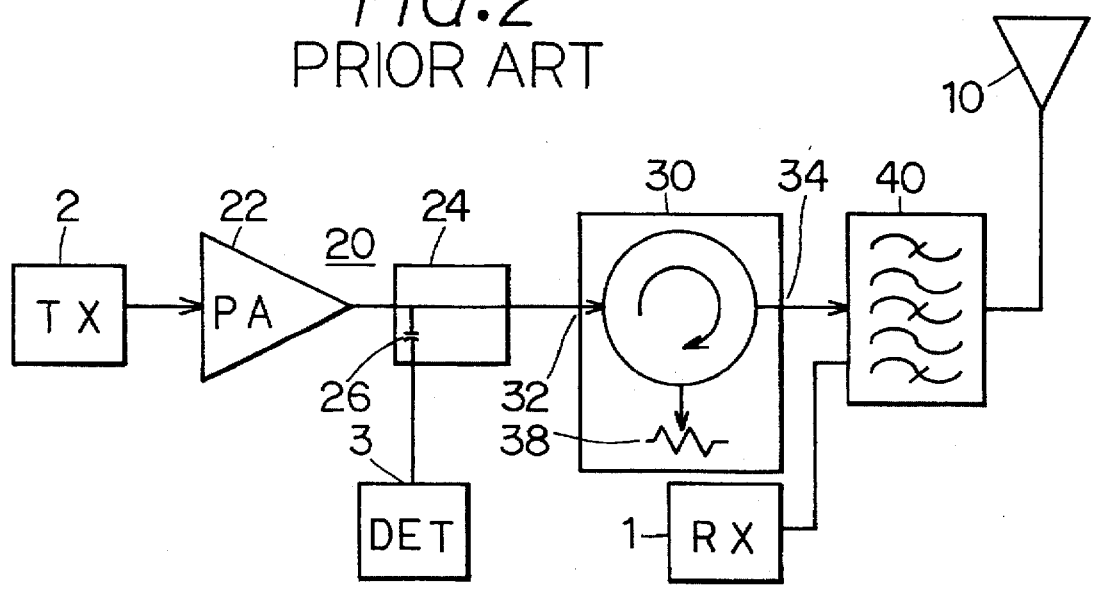
FIG. 2 is a block diagram of a section of a prior art half duplex RF transceiver using a duplex filter.
Figure 4:
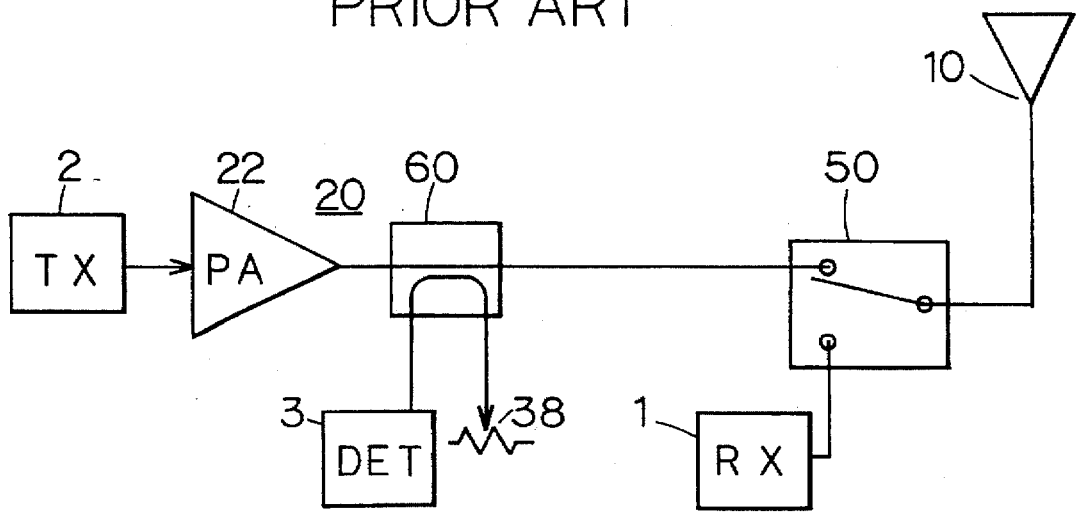
FIG. 4 is a block diagram of a section of a prior art half duplex RF transceiver using a directional coupler.

|  | TR. PATH LOSS (dB) | REC. PATH LOSS (dB) | PWR. AMP. ISOLATED | RECEIVER ISOLATED |
|---|---|---|---|---|
| FIG. 5 First Emb. | 0.9 | 1.2 | Yes | Yes |
| FIG. 1 Circulator | 0.9 | 0.7 | Yes | No |
| FIG. 2 Dupl. Filter | 1.9 | 0.9 | Yes | Yes |
| FIG. 3 T/R Switch | 1.4 | 2.0 | Yes | Yes |
| FIG. 4 Dir. Coupler | 0.9 | 2.0 | No | Yes |

Thus, the first embodiment of the present invention provides the lowest transmission path loss where the power amplifier is isolated, and it also provides a relatively low-loss receive path. This enables a half duplex transceiver according to the present invention to provide greater transmitter efficiency, and therefore increased talk time.

Figure 7:
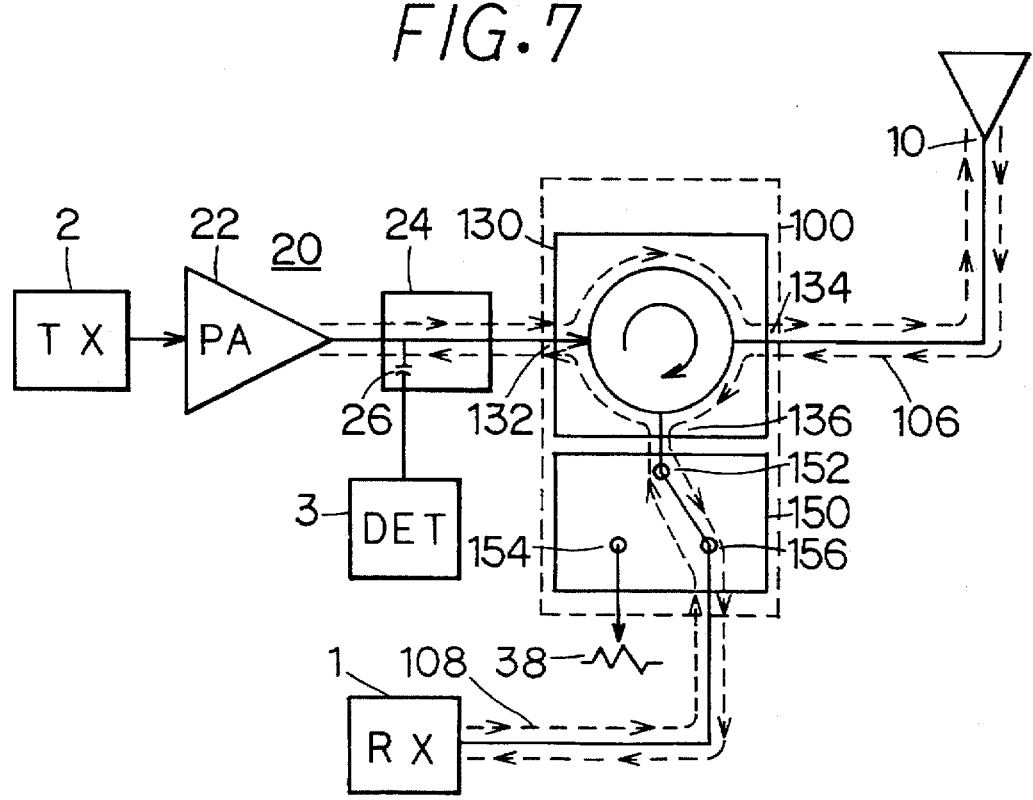
FIG. 7 is a block diagram showing a reflected receive signal path in the first embodiment.

Now, consider operation of the first embodiment in receive mode. If the impedance of receiver 1 is not properly matched to the rest of the system, part of the antenna signal output by the T/R switch 150 is reflected by the receiver 1 through the T/R switch 150 as shown by the reflected antenna signal path 108 in FIG. 7. In this case, the circulator 130 passes reflected antenna signal power passing through the receiver port 136 to the transmit port 132 of the circulator unit 100 and through the sampler 24 to the power amplifier 22.

During receive mode, the power amplifier 22 is usually unbiased; therefore, it may not present a matched load at its output. In this case, the power amplifier 22 again reflects the antenna signal back through the sampler 24 and the antenna signal enters the circulator unit 100 at the transmit port 132, passes through the circulator 130, and exits from antenna port 134 to the antenna 10. If the antenna 10 also has impedance mismatching, some of the reflected antenna signal power is yet again reflected through the circulator unit 100 to the receiver.

Figure 8:
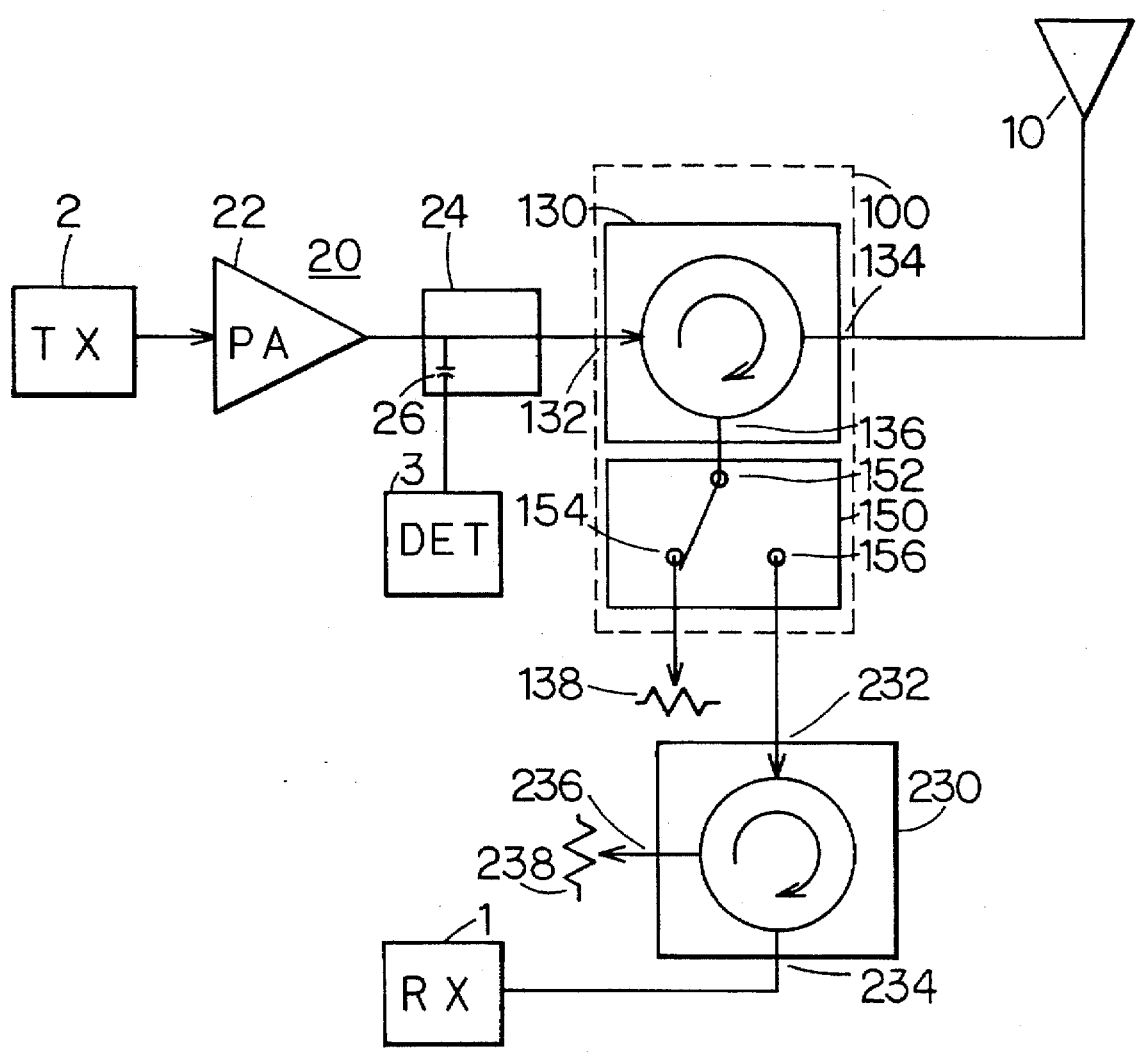
FIG. 8 is a block diagram of a section of an RF transceiver according to a second embodiment of the present invention.
Figure 9:
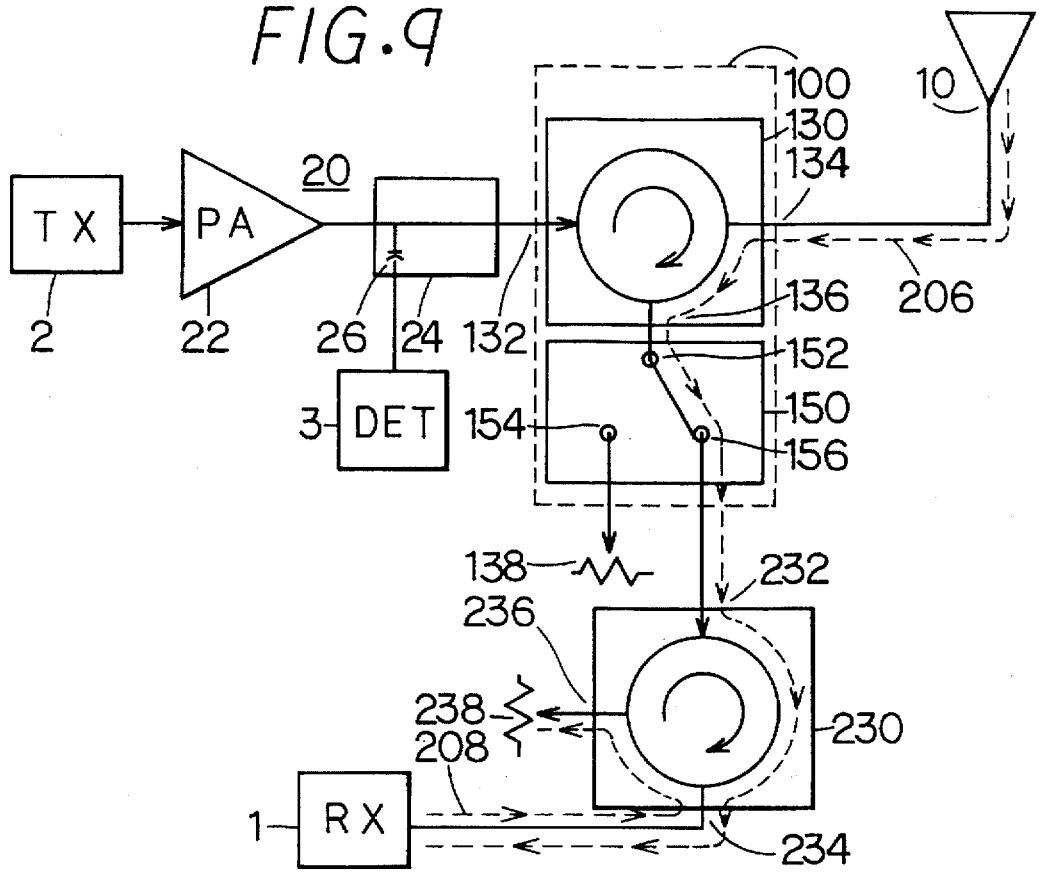
FIG. 9 is a block diagram showing a reflected receive path in the second embodiment.

Since the power level of the antenna signals are usually quite low and a reflected signal which has made a "grand tour" is substantially attenuated, this parasitic path is unlikely to damage the power amplifier 22; however, it could compromise the integrity of the antenna signal presented to the receiver 1. In some applications, this may be a negligible consideration; however, to eliminate this potential problem in all cases, a second embodiment of the present invention shown in FIG. 8 includes an auxiliary circulator 230 connected to the receive terminal 156 of the T/R switch 150. This embodiment operates in a manner similar to that described above in connection with FIGS. 6(A) and 6(B); however, when the transceiver is in receive mode, the antenna signal picked up by antenna 10 passes through antenna port 134 of circulator unit 100, circulator 130 and T/R switch 150 and enters the auxiliary circulator 230 through its antenna port 232. The auxiliary circulator 230 directs the signal to the receiver 1 via the receiver terminal 534, as shown by the antenna signal path 206 in FIG. 9.

If the receiver 1 is mismatched and reflects some of the power back to the rest of the system, the auxiliary circulator 230 receives it at the receiver port 234 and directs it through termination port 236 to a second impedance matching load 238, which dissipates it as shown by the reflected antenna signal path 208. Thus, no secondary reflected antenna signals are presented to the receiver 1, and the quality of the antenna signal presented thereto is not degraded. Of course, the presence of the auxiliary circulator 230 means that the second embodiment has a larger antenna signal path loss (about 0.7 dB larger) relative to the first embodiment; however, this is not an important factor in many cases.

The second embodiment is particularly suitable for use in transceivers employing direct downconversion, or "zero IF" receivers, in which the antenna signal is directly converted to baseband by heterodyning it with a local oscillator signal which is at the same frequency as the carrier of the antenna signal. A common drawback of such receivers is that a portion of the local oscillator signal is radiated out of the receiver when it is in receive mode. Since the auxiliary circulator 230 and the second impedance matching load 238 in the second embodiment cooperate to effectively eliminate any outgoing signals from the receiver, this undesirable side effect may be avoided.

Figure 10:
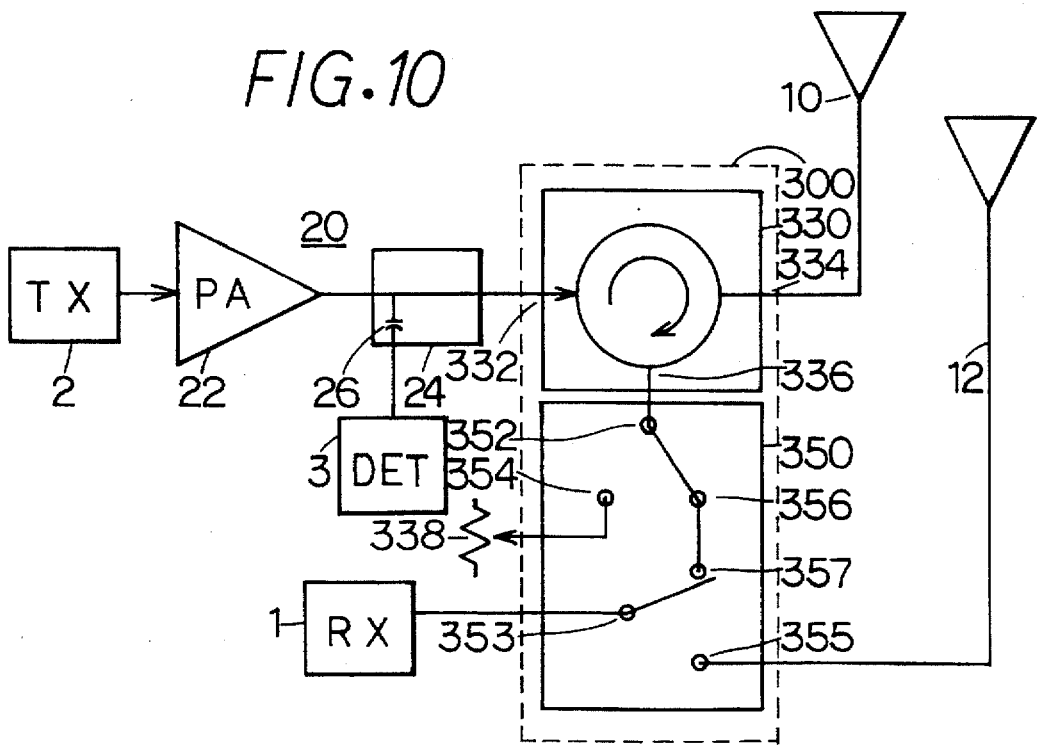
FIG. 10 is a block diagram of a section of an RF transceiver according to a third embodiment of the present invention.

A common feature of cellular telephones is a diversity reception mode, which uses a separate antenna for diversity reception operations. A third embodiment of the present invention which implements a diversity reception capability is shown in FIG. 10. This embodiment operates in a fashion similar to the above embodiments; however, it uses a double-pole, double-throw T/R switch 350 instead of the single-pole, double throw switch 150 of other embodiments. A pole terminal 352 of a first section of the T/R switch 350 is connected in a manner similar to the previous embodiments; however, a second receive terminal 356 thereof is not connected to the receiver 1. Instead, it is connected to a first throw terminal 357 of the pole terminal 353 in a second switch section, and that pole terminal 353 is connected to the receiver 1.

When the transceiver is in receive mode so that the pole terminal 352 of the first section of the T/R switch 350 is as shown in FIG. 10 and the transceiver is in non-diversity reception mode so that the pole terminal 353 of the second section of the T/R switch 350 is positioned as shown in that Figure, the antenna signal path is essentially the same as that of the first embodiment; however, its impedance is increased slightly by the presence of the second section of the T/R switch 350.

When the transceiver is in diversity reception mode so that the pole terminal 353 of the second section of the T/R switch is in the position opposite the one shown in FIG. 10, antenna 10 is not used, and a diversity antenna signal path is established between a diversity reception antenna 12 and the receiver 1 via the second throw terminal 355 of the second section of the T/R switch.

Figure 11:
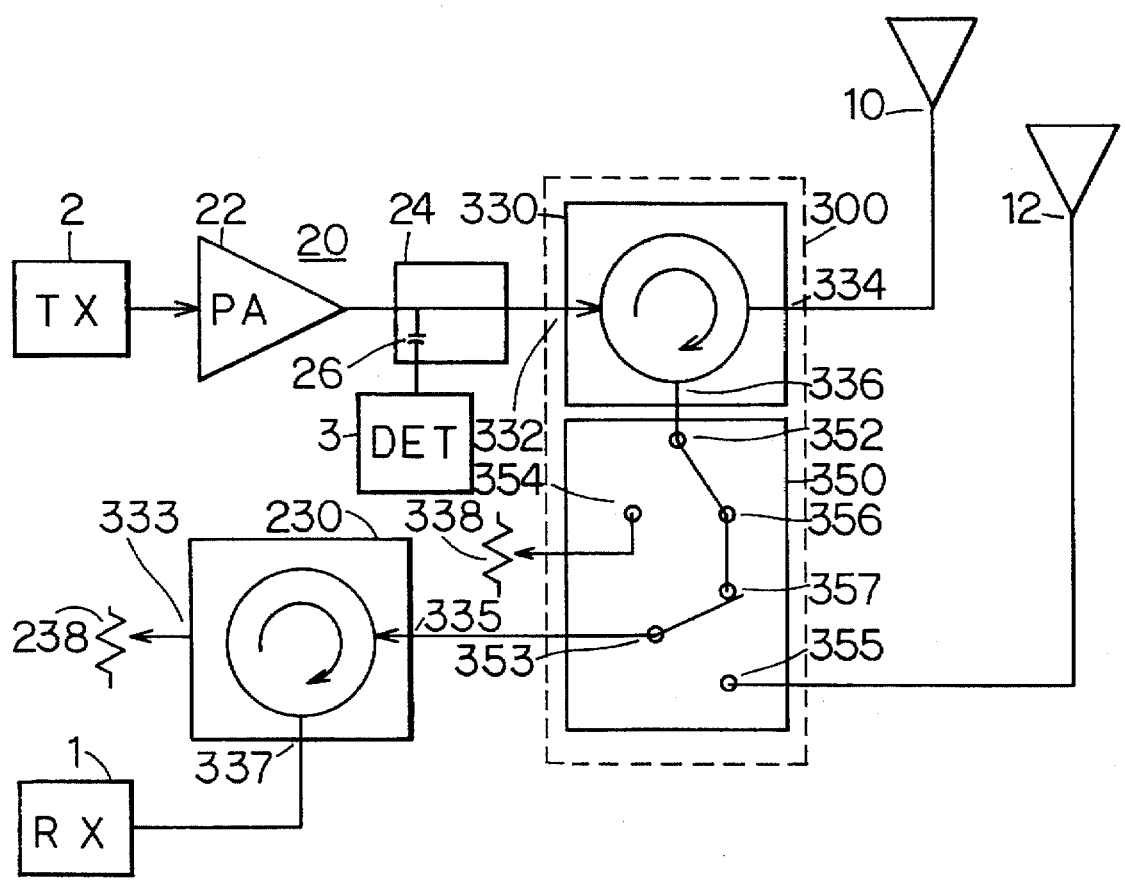
FIG. 11 is a block diagram of a section of an RF transceiver according to a fourth embodiment of the present invention.

Variations on the above designs are of course possible. For example, FIG. 11 shows a fourth embodiment of the present invention which implements both the reflected antenna signal isolation feature and the diversity reception feature. This embodiment is similar to the one shown in FIG. 10; however, the second pole terminal 353 of the second section of the T/R switch 350 is connected to a second circulator 230 and a second impedance matching load 238 which operate in a similar fashion to their counterparts in the above-described second embodiment.

As an additional variation on the invention, tuning networks may be provided on one or more component ports in any of the embodiments to further reduce RF losses due to uncompensated RF transitions.

Although the present invention has been fully described in connection with the preferred embodiments thereof with reference to the accompanying drawings, it is to be noted that various changes and modifications will become apparent to those skilled in the art. For example, although the invention has been generally discussed in the context of a digital half duplex transceiver, it is readily applicable to analog transceivers as well. Further, although use of a load matching resistor in the invention has been discussed, any suitable electrical load termination element may of course be used. Such changes and modifications are to be understood as being included within the scope of the present invention as defined by the appended claims.

What is claimed is:

1. Circulator section for a transceiver, said circulator section comprising:

circulator means, having a transmitter port, a receiver port and an antenna port, for receiving a transmit signal at said transmitter port and an antenna signal at said antenna port, for providing said transmit signal to said antenna port, and for providing said antenna signal to said receiver port; and switching means, connected to said receiver port, for selectively connecting said receiver port to a receiver terminal of said switching means and to an impedance matching load, said switching means including a first switch section and a second switch section;

wherein said first switch section is connected to said receiver port to selectively connect said receiver port to said impedance matching load and to said second switch section; and said second switch section selectively connects said receiver terminal to said first switch section and to a diversity antenna signal.

2. The circulator section of claim 1, wherein said switching means operates synchronously with said transmit signal to connect said receiver port to said receiver terminal when said transmit signal is not present, thereby presenting said antenna signal at said receiver terminal, and to connect said receiver port to said impedance matching load when said transmit signal is present.

3. The circulator section of claim 2, wherein said antenna signal comprises a receive signal and a reflected transmit signal.

4. The circulator section of claim 1, wherein said circulator means includes a miniature ferrite circulator.

5. The circulator section of claim 1, wherein at least one of said first and second switch sections is an electronically-controlled switch implemented in one of GaAs and Si technology.

6. The circulator section of claim 1, wherein said circulator means and said switching means are housed in an integral module.

7. The circulator section of claim 1, wherein said impedance matching load has an impedance selected so that substantially no part of said antenna signal is reflected from said load.

8. The circulator section of claim 1, wherein said circulator means is a three-port circulator.

9. The circulator section of claim 1, wherein said switching means selectively passes electrical signals therethrough.

10. A transceiver comprising:
an antenna providing an antenna signal;
a transmitter, including a power amplifier generating a transmit signal;
a receiver; and
circulation unit means having a transmit port connected to said transmitter an antenna port connected to said antenna, and a receiver port connected to said receiver, for providing said transmit signal to said antenna, and for selectively connecting said antenna to said receiver and to an impedance matching load connected to said circulation unit means, said circulation unit means including a first switch section and a second switch section;
wherein said first switch section receives said antenna signal and selectively connects said antenna to said impedance matching load and to said second switch section; and
said second switch section selectively connects said receiver to said first switch section and to a diversity reception antenna providing a diversity antenna signal.

11. The transceiver of claim 10, wherein said circulation unit means operates responsive to a duplex mode of said transceiver to connect said antenna to said receiver when said transceiver is in a receive mode, thereby presenting said antenna signal to said receiver, and to connect said antenna to said impedance matching load when said transceiver is in a transmit mode.

12. The transceiver of claim 11, wherein when said transceiver is in transmit mode, said antenna signal includes a receive signal representative of radio waves picked up by said antenna, and a reflected transmit signal representative of a portion of said transmit signal reflected by said antenna.

13. The transceiver of claim 10, wherein:
said first switch section operates responsive to a duplex mode of said transceiver to connect said antenna to said receiver when said transceiver is in a receive mode, and to connect said antenna to said impedance matching load when said transceiver is in a transmit mode; and
said second switch section operates responsive to a diversity reception mode of said transceiver.

14. The transceiver of claim 10, further comprising a sampler electrically connected between said power amplifier and said circulation unit means.

15. A circulator section for a transceiver, said circulator section comprising:
a first circulator, having a transmitter port, a receiver port and an antenna port, for receiving a transmit signal at said transmitter port and an antenna signal at said antenna port, for providing said transmit signal to said antenna port, and for providing said antenna signal to said receiver port;
a first switch, connected to said receiver port and to a first impedance matching load, for selectively connecting said receiver port to a receiver terminal of said first switch and to said first impedance matching load;
a second circulator, having an antenna port connected to said receiver terminal of said first switch, a receiver port and a termination port, for receiving said antenna signal from said switching means at said antenna port of said second circulator, for providing said antenna signal to said receiver port of said second circulator, and for providing any signals received at said receiver port of said second circulator to a second impedance matching load connected to said termination port of said second circulator; and
a second switch, connected to said second circulator, said first switch and a diversity antenna;
wherein said first switch is for selectively providing said antenna signal to said impedance matching load and to said second switch; and
said second switch is for selectively connecting said second circulator to said first switch and to said diversity antenna.

16. The circulator section of claim 15, wherein said switching means operates synchronously with said transmit signal to connect said receiver port of said first circulator to said first impedance matching load when said transmit signal is present and for connecting said receiver port of said first circulator to said receiver port of said second circulator when said transmit signal is not present.

17. The circulator section of claim 16, wherein said antenna signal comprises a receive signal and a reflected signal.

18. The circulator section of claim 15, wherein said first and second impedance matching loads have impedances selected so that substantially no part of signals applied thereto are reflected therefrom.

* * * * *